(12) United States Patent
Ash et al.

(10) Patent No.: US 10,592,156 B2
(45) Date of Patent: Mar. 17, 2020

(54) I/O LOAD BALANCING BETWEEN VIRTUAL STORAGE DRIVES MAKING UP RAID ARRAYS

(71) Applicant: International Business Machines Corporation, Armonk, NY (US)

(72) Inventors: Kevin J. Ash, Tucson, AZ (US); Matthew G. Borlick, Tucson, AZ (US); Lokesh M. Gupta, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/972,127

(22) Filed: May 5, 2018

(65) Prior Publication Data

US 2019/0339897 A1 Nov. 7, 2019

(51) Int. Cl.
*G06F 3/06* (2006.01)
*G06F 17/18* (2006.01)

(52) U.S. Cl.
CPC ............ *G06F 3/0647* (2013.01); *G06F 3/067* (2013.01); *G06F 3/0611* (2013.01); *G06F 3/0635* (2013.01); *G06F 3/0644* (2013.01); *G06F 3/0653* (2013.01); *G06F 3/0664* (2013.01); *G06F 3/0689* (2013.01); *G06F 17/18* (2013.01)

(58) Field of Classification Search
CPC .... G06F 3/0647; G06F 3/0635; G06F 3/0689; G06F 3/067; G06F 3/0644; G06F 3/0653; G06F 3/0664; G06F 3/0611; G06F 17/18
USPC ...................... 718/105; 711/114, 6, 158, 170
See application file for complete search history.

(56) References Cited

U.S. PATENT DOCUMENTS

| | | | | |
|---|---|---|---|---|
| 5,845,319 A | * | 12/1998 | Yorimitsu | G06F 3/0626 711/114 |
| 6,055,577 A | * | 4/2000 | Lee | H04L 29/06027 709/233 |
| 6,886,074 B1 | * | 4/2005 | Narayanaswamy | G06F 3/0613 709/201 |
| 8,819,344 B1 | * | 8/2014 | Faibish | G06F 3/067 711/147 |
| 9,513,814 B1 | * | 12/2016 | Can | G06F 3/061 |
| 9,575,670 B1 | * | 2/2017 | Guo | G06F 3/0613 |
| 2013/0145091 A1 | * | 6/2013 | Klemm | G06F 11/1076 711/114 |

(Continued)

*Primary Examiner* — Hong C Kim
(74) *Attorney, Agent, or Firm* — Nelson and Nelson; Daniel P. Nelson; Alexis V. Nelson

(57) ABSTRACT

A method for balancing load among virtual storage drives is disclosed. In one embodiment, such a method includes providing multiple storage drives and dividing each storage drive into multiple virtual storage drives. The method further creates RAID arrays from the virtual storage drives. Each RAID array is made up of extents that are striped across its virtual storage drives. The method tracks I/O to each virtual storage drive to determine which virtual storage drives have high I/O traffic and which virtual storage drives have low I/O traffic. The virtual storage drives are correlated to their respective RAID arrays. The method migrates extents from RAID arrays having virtual storage drives with high I/O traffic to RAID arrays having virtual storage drives with low I/O traffic. A corresponding system and computer program product are also disclosed.

20 Claims, 7 Drawing Sheets

(56) References Cited

U.S. PATENT DOCUMENTS

| | | | |
|---|---|---|---|
| 2013/0346969 A1* | 12/2013 | Shanmuganathan | ........................ G06F 9/4856 718/1 |
| 2014/0250269 A1* | 9/2014 | Shanbhag | ............. G06F 3/0689 711/114 |
| 2015/0199129 A1 | 7/2015 | Nair | |
| 2015/0324126 A1 | 11/2015 | Nakajima | |
| 2016/0357443 A1 | 12/2016 | Li et al. | |
| 2017/0270018 A1* | 9/2017 | Xiao | ..................... G06F 3/0617 |

* cited by examiner

I/O LOAD BALANCING BETWEEN VIRTUAL STORAGE DRIVES MAKING UP RAID ARRAYS

BACKGROUND

Field of the Invention

This invention relates to systems and methods for balancing load among virtual storage drives.

Background of the Invention

Processor speeds and main memory sizes have historically increased at a much faster pace than access times to storage drives, such as hard disk drives or solid state drives. As a result, storage drives in a storage system are often the bottleneck in a computing system. This problem is often addressed by adding storage drives to the storage system. Adding storage drives also increases storage capacity and provides improved access concurrency. However, to take advantage of improved access concurrency, the storage system typically needs to distribute I/O across the storage drives as evenly as possible. Stated otherwise, in order to prevent performance bottlenecks within the system, the storage system needs to avoid as much as possible load imbalances where certain storage drives are utilized more than others.

Problems with load imbalance may become more problematic as the storage capacity of storage drives increases. That is, larger storage drives may create more of a performance bottleneck than smaller storage drives since they may need to accommodate additional I/O to their larger number of addressable storage elements. For this reason, load balancing within storage systems may take on additional importance when using larger capacity storage drives. In certain cases, the storage capacity of larger storage drives may be divided into smaller "virtual storage drives" to alleviate some problems with performance bottlenecks as well as address issues with the addressability of storage elements within the larger storage drives. However, there is still a need to balance load across the virtual storage drives to ensure that some virtual storage drives are not receiving significantly more I/O than other virtual storage drives and thereby creating performance bottlenecks within the system.

In view of the foregoing, what are needed are systems and methods to balance load among virtual storage drives in a storage system.

SUMMARY

The invention has been developed in response to the present state of the art and, in particular, in response to the problems and needs in the art that have not yet been fully solved by currently available systems and methods. Accordingly, the invention has been developed to provide improved systems and methods for balancing load among virtual storage drives. The features and advantages of the invention will become more fully apparent from the following description and appended claims, or may be learned by practice of the invention as set forth hereinafter.

Consistent with the foregoing, a method for balancing load among virtual storage drives is disclosed. In one embodiment, such a method includes providing multiple storage drives and dividing each storage drive into multiple virtual storage drives. The method further creates RAID arrays from the virtual storage drives. Each RAID array is made up of extents that are striped across its virtual storage drives. The method tracks I/O to each virtual storage drive to determine which virtual storage drives have high I/O traffic and which virtual storage drives have low I/O traffic. The virtual storage drives are correlated to their respective RAID arrays. The method migrates extents from RAID arrays having virtual storage drives with high I/O traffic to RAID arrays having virtual storage drives with low I/O traffic. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
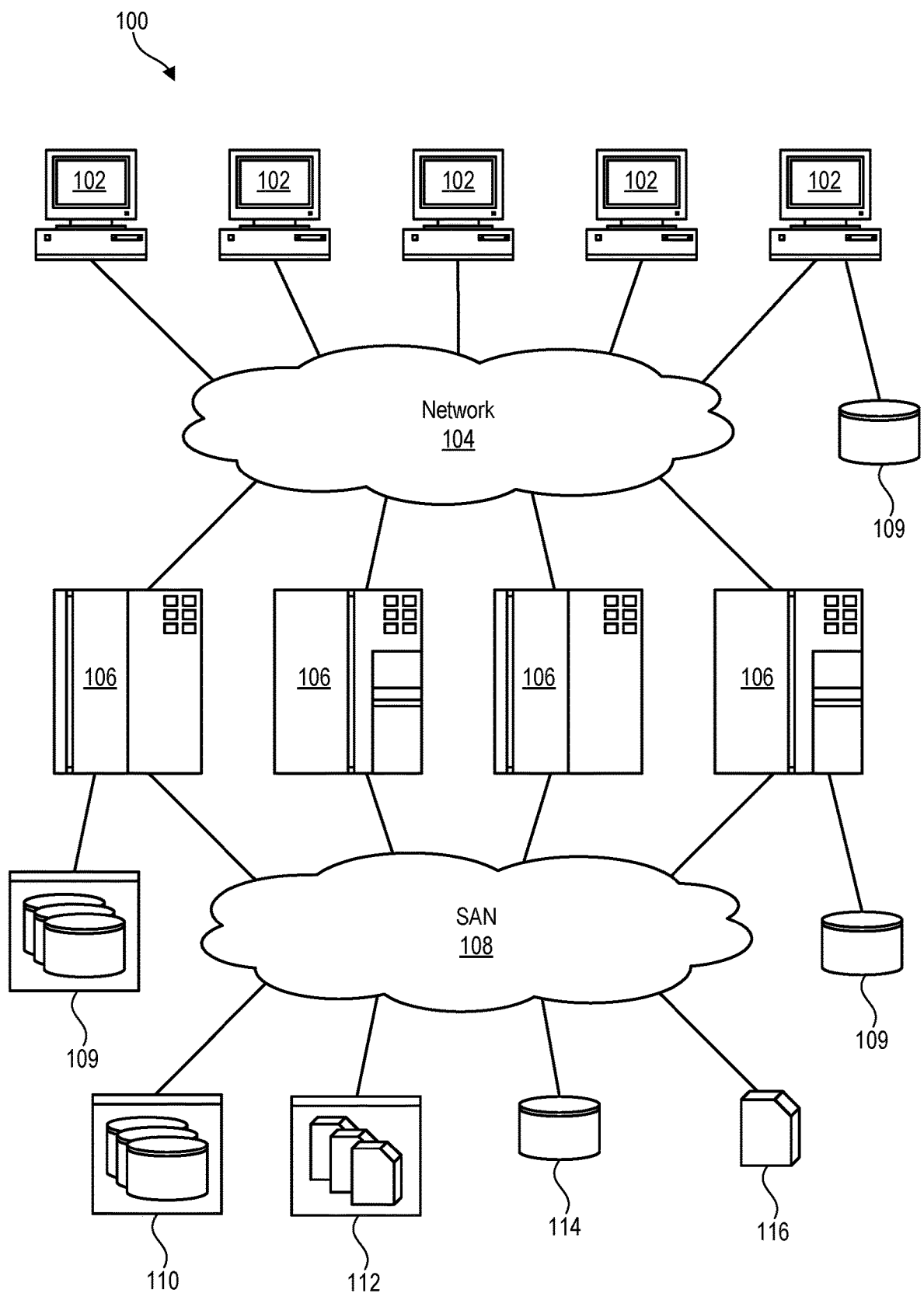
FIG. 1 is a high-level block diagram showing one example of a network environment in which systems and methods in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
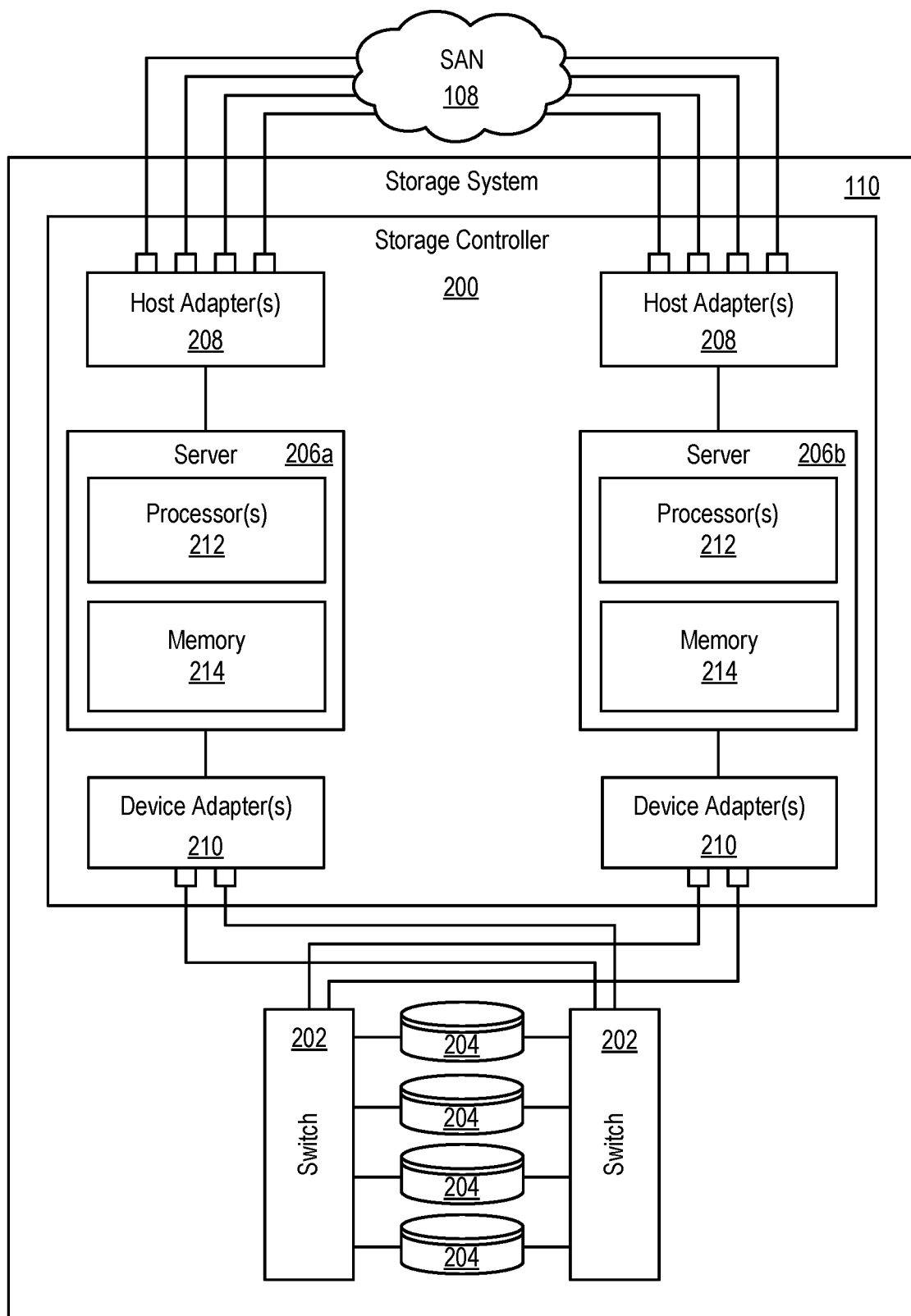
FIG. 2 is a high-level block diagram showing one example of a storage system, comprising an array of storage drives, for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
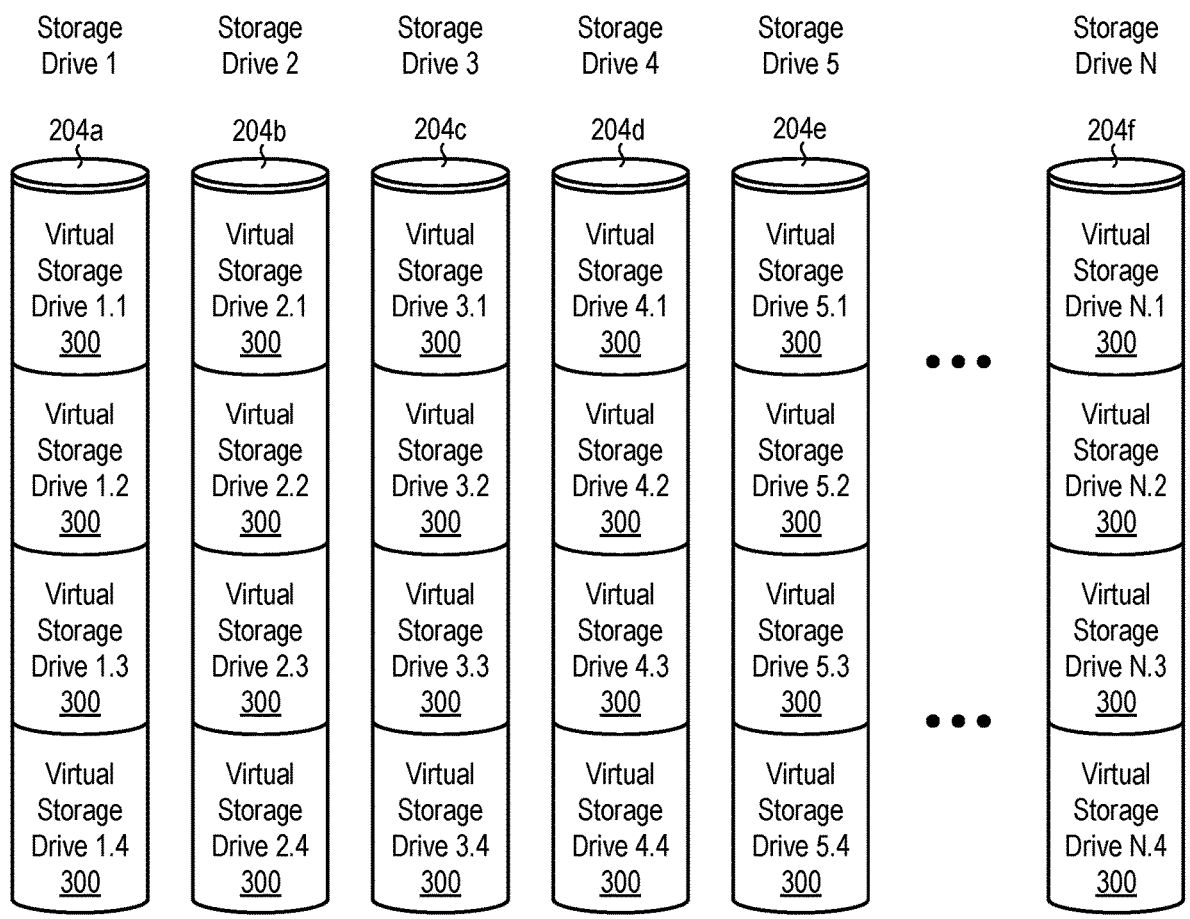
FIG. 3 is a high-level block diagram showing how storage drives may be logically divided into virtual storage drives.

Referring to FIG. 3, as previously mentioned, processor speeds and main memory sizes have historically increased at a much faster pace than access times to storage drives 204, such hard disk drives and solid state drives. As a result, storage drives 204 in a storage system 110 are often the bottleneck in a computing system. This problem is often addressed by adding storage drives 204 to the storage system 110. Adding storage drives 204 also increases storage capacity and provides improved access concurrency. However, to take advantage of the improved access concurrency, the storage system 110 typically needs to distribute I/O across the storage drives 204 as evenly as possible. That is, to prevent performance bottlenecks within the system, the storage system 110 needs to avoid as much as possible I/O load imbalances where certain storage drives 204 are utilized more than others.

Problems with load imbalance may become more problematic as the storage capacity of storage drives 204 increases. That is, larger storage drives 204 may create more of a performance bottleneck than smaller storage drives 204 since they may need to accommodate additional I/O to their larger number of addressable storage elements. For this reason, load balancing within storage systems 110 may take on additional importance when using larger capacity storage drives 204. In certain cases, the storage capacity of larger storage drives 204 may be divided into smaller virtual storage drives 300 to alleviate some problems with performance bottlenecks as well as address issues with the addressability of storage elements within the larger storage drives 204. FIG. 3 shows an example of an array of storage drives 204a-f, where each storage drive 204 is logically divided into four smaller virtual storage drives 300. Other divisions of storage space are possible and within the scope of the invention.

Figure 4:
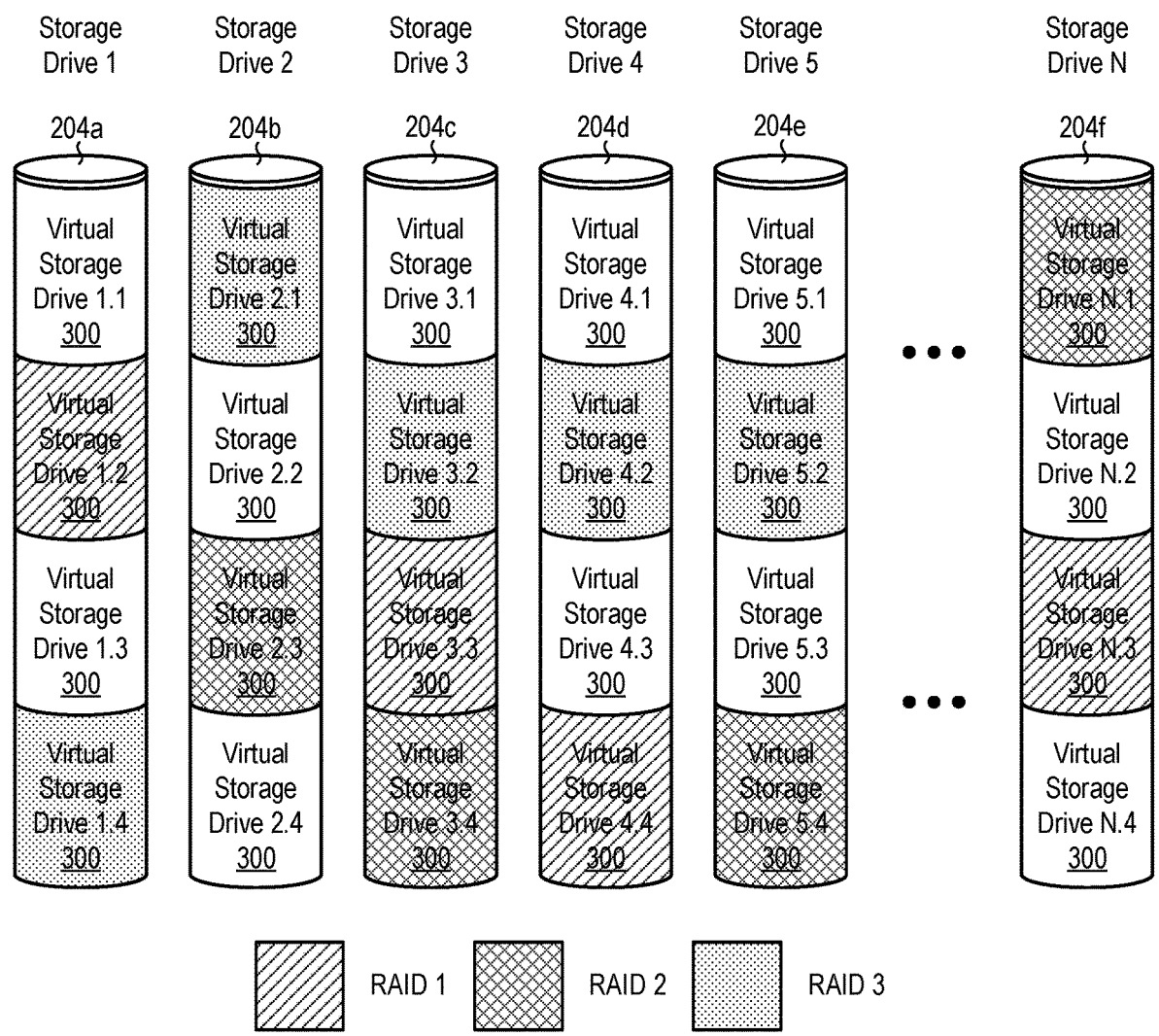
FIG. 4 is a high-level block diagram showing RAIDs created from the virtual storage drives.

Referring to FIG. 4, in certain cases, virtual storage drives 300 may be combined to create redundant arrays of independent disks (RAIDs) having a designated RAID level. A RAID level may be selected to provide a desired amount of data redundancy and/or performance. In order to preserve the data redundancy and/or performance characteristics of the selected RAID level, systems and methods in accordance with the invention may ensure that a RAID does not include more than one virtual storage drive 300 from the same physical storage drive 204. FIG. 4 shows three different RAIDs (RAID 1, RAID 2, RAID 3) implemented on the array of storage drives 204a-f. For example, RAID 1 utilizes a virtual storage drive 300 on Storage Drive 1, Storage Drive 3, Storage Drive 4, and Storage Drive N. As can be observed, each RAID includes no more than one virtual storage drive 300 on any given physical storage drive 204. The RAIDs also do not necessarily include virtual storage drives 300 on all of the storage drives 204 (although they could) nor do the RAIDs need to utilize the same number of virtual storage drives 300. The RAIDs may include the same or a different number of virtual storage drives 300.

Even when dividing storage drives 204 into smaller virtual storage drives 300, there is still a need to balance I/O load across the virtual storage drives 300 to ensure that some virtual storage drives 300 are not receiving significantly more I/O than other virtual storage drives 300 and thereby creating performance bottlenecks within the system. Thus, systems and methods may be provided to balance load among virtual storage drives 300 in a storage system 110.

Figure 5:
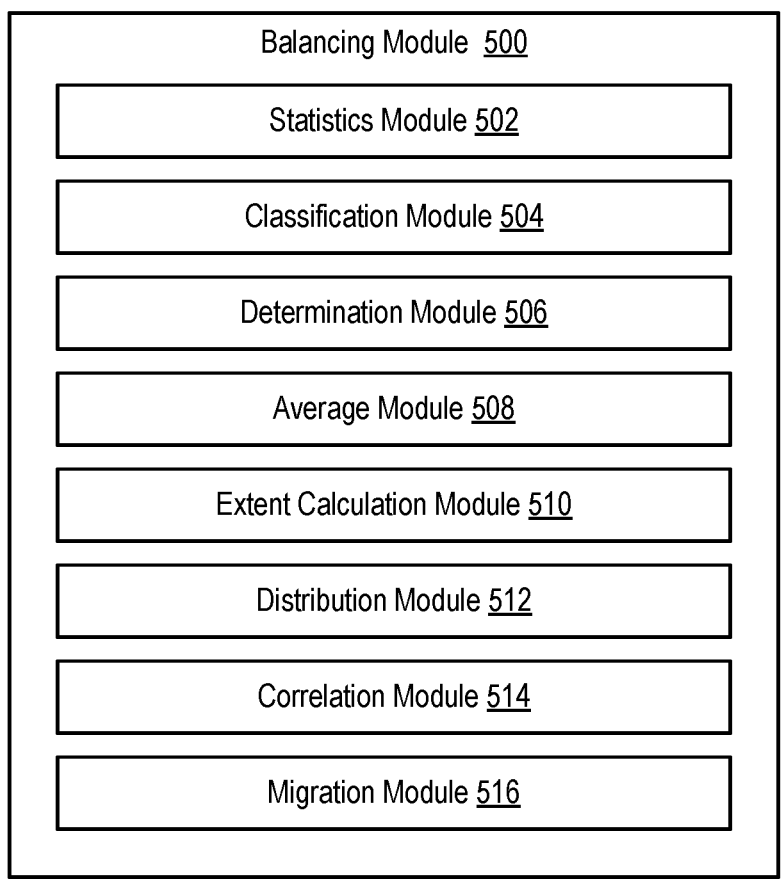
FIG. 5 is a high-level block diagram showing a balancing module for balancing I/O load among the virtual storage drives.

FIG. 5 shows one embodiment of a balancing module 500 that may be used to balance load among virtual storage drives 300 in a storage system 110. In certain embodiments, this balancing module 500 is implemented all or partly within a storage system 110 in a way that is transparent to a host system 106. The balancing module 500 may be implemented in software, hardware, firmware, or a combination thereof. The balancing module 500 may include various sub-modules 502-516 to provide various features and functions. These sub-modules are presented by way of example and not limitation. More or fewer sub-modules may be provided in different embodiments. For example, the functionality of some sub-modules may, in certain embodiments, be combined into a single or smaller number of sub-modules, or the functionality of a single sub-module may be distributed across several sub-modules.

As shown, the balancing module 500 may include one or more of a statistics module 502, classification module 504, determination module 506, average module 508, extent calculation module 510, distribution module 512, correlation module 514, and migration module 516.

The statistics module 502 may maintain statistics for each virtual storage drive 300 in the storage drives 204. These statistics may include, for example, average input/output operations per second (IOPS) for each virtual storage drive 300 during a specified time period (e.g., 24 hours), and peak TOPS for each virtual storage drive 300 during a specified time period (e.g., 24 hours). In certain embodiments, the statistics module 502 may also measure the TOPS to each virtual storage drive 300 at smaller intervals (e.g., five minutes). The statistics module 502 may in certain embodiments use this information to calculate a standard deviation from the average TOPS during these intervals.

Using the statistics gathered by the statistics module 502, the classification module 504 may classify each virtual storage drive 300 as either a high I/O virtual storage drive 300 or a low I/O virtual storage drive 300. One or more thresholds (e.g., a single threshold or a high and low threshold) may be established to determine whether a virtual storage drive 300 qualifies as a high I/O virtual storage drive 300 or low I/O virtual storage drive 300.

The determination module 506 may then determine whether all the virtual storage drives 300 are classified as either high I/O virtual storage drives 300 or low I/O virtual storage drives 300. If this is the case, then no I/O balancing is needed for the virtual storage drives 300 since all of the virtual storage drive 300 are processing a similar amount of I/O. If this is not the case, however, then the balancing module 500 may balance I/O between the virtual storage drives 300.

To accomplish this, the average module 508 may calculate various averages associated with the virtual storage drives 300. For example, the average module 508 may calculate the average TOPS over a period of time (e.g., 24 hours) for all virtual storage drives 300 that have been classified as high I/O virtual storage drives 300. The average module 508 may also calculate the average TOPS over a period of time (e.g., 24 hours) for all virtual storage drives 300 that have been classified as low I/O virtual storage drives 300.

The extent calculation module 510 may then calculate a number of extents to migrate from the high I/O virtual storage drives 300 to the low I/O virtual storage drives 300. In certain embodiments, this may be accomplished using the following equation:

> Number of Extents to Migrate=Constant N*(Total Storage Capacity of All Virtual Storage Drives) *((Average TOPS for High I/O Virtual Storage Drives)−(Average TOPS for Low I/O Virtual Storage Drives))

The distribution module 512 may then distribute the calculated number of extents between the virtual storage drives 300. In certain embodiments, the distribution module 512 may determine how many extents that will be migrated from high I/O virtual storage drives 300 based on a difference between the average TOPS for a particular high I/O virtual storage drive 300 and the average TOPS for all high I/O virtual storage drives 300. This will cause more extents to be migrated from high I/O virtual storage drives 300 that are above the average TOPS for all high I/O virtual storage drives 300.

Similarly, in certain embodiments, the distribution module 512 may determine how many extents that will be migrated to low I/O virtual storage drives 300 based on the difference between the average TOPS for a particular low I/O virtual storage drive 300 and the average TOPS for all low I/O virtual storage drives 300. This will cause more extents to be migrated to low I/O virtual storage drives 300 that are below the average TOPS for all low I/O virtual storage drives 300.

Figure 7:
FIG. 7 is a high-level block diagram showing how extents may be distributed to high I/O storage drives and low I/O storage drives.

This concept is clearly shown in FIG. 7. As shown in FIG. 7, a certain number of extents 700, represented by boxes 700, are migrated from high I/O virtual storage drives 300a to low I/O virtual storage drives 300b. Some high I/O virtual storage drives 300a have average TOPS that are above the average TOPS 702a for all high I/O virtual storage drives 300a, while other high I/O virtual storage drives 300a have average TOPS that are below the average TOPS 702a for all high I/O virtual storage drives 300a. Similarly, some low I/O virtual storage drives 300b have average TOPS that are below the average TOPS 702b for all low I/O virtual storage drives 300b, while other low I/O virtual storage drives 300b have average TOPS that are above the average TOPS 702b for all low I/O virtual storage drives 300b. As can be seen in FIG. 7, more extents 700 are migrated from high I/O virtual storage drives 300 that are above the average 702a than are below the average 702a. Similarly, more extents 700 are migrated to low I/O virtual storage drives 300 that are below the average 702b than are above the average 702b.

Referring again to FIG. 5, once the distribution module 512 distributes the calculated number of extents 700 between the virtual storage drives 300, the correlation module 514 correlates the virtual storage drives 300 to the RAID arrays with which they are associated. In doing so, the number of extents 700 that are migrated to/from a particular RAID may be the sum of the number of extents 700 that are migrated to/from each virtual storage drive 300 that is associated with the RAID. At this point, the correlation module 514 may know how many extents 700 to migrate to/from each RAID array in order to balance I/O between the virtual storage drives 300. The migration module 516 may then migrate extents 700 between the RAID arrays based on the numbers computed.

Figure 6:
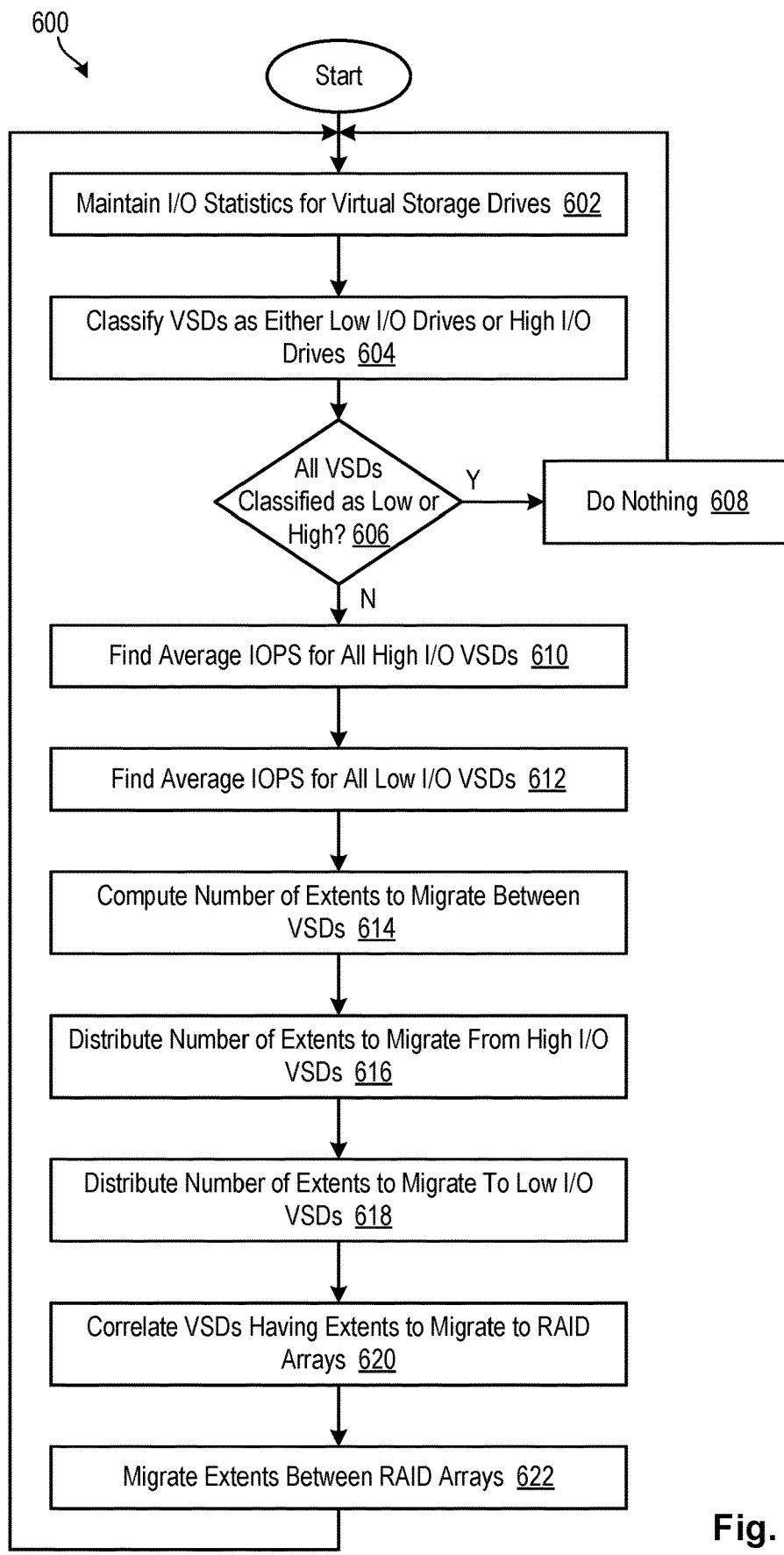
FIG. 6 is a process flow diagram showing a method for balancing I/O load among the virtual storage drives.

Referring to FIG. 6, one embodiment of a method 600 for balancing I/O load among virtual storage drives 300 is illustrated. As shown, the method 600 initially maintains 602 I/O statistics for virtual storage drives 300 in a storage system 110. These statistics may include, for example, average IOPS for each virtual storage drive 300 over specified periods of time, peak IOPS for each virtual storage drive 300 over specified periods of time, standard deviations from the average IOPS, and the like.

The method 600 may then classify 604 each virtual storage drive 300 as either a low I/O virtual storage drive 300 or a high I/O virtual storage drive 300. The method 600 then determines 606 whether all of the virtual storage drives 300 are classified as either low I/O virtual storage drives 300 or high I/O virtual storage drives 300. If so, the method 600 does 608 nothing since I/O is already essentially balanced between the virtual storage drives 300.

If not all virtual storage drives 300 are classified as either low I/O virtual storage drives 300 or high I/O virtual storage drives 300, the method 600 finds 610 the average IOPs for all virtual storage drives 300 that are classified as high I/O virtual storage drives 300, and finds 612 the average IOPs for all virtual storage drives 300 that are classified as low I/O virtual storage drives 300. Using these averages, the method 600 computes 614 a number of extents to migrate between the virtual storage drives 300. The method 600 then distributes 616, 618 the number of extents to migrate across the high I/O virtual storage drives 300 and the low I/O virtual storage drives 300. This may be accomplished using a technique such as that illustrated in FIG. 7.

Once the extents are distributed across the high I/O virtual storage drives 300 and low I/O virtual storage drives 300, the method 600 correlates 620 the virtual storage drives 300 to the RAIDs in which they belong. This may determine how many extents 700 to migrate to/from each RAID array. The method 600 then migrates 622 extents 700 between the RAID arrays based on the numbers computed in order to balance I/O between the virtual storage drives 300.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for balancing load among virtual storage drives, the method comprising:
providing a plurality of physical storage drives;
dividing each physical storage drive into a plurality of virtual storage drives;
creating redundant array of independent disks (RAID) arrays from the virtual storage drives such that virtual storage drives on the same physical storage drive may be utilized in different RAID arrays, wherein each RAID array is made up of extents that are striped across its virtual storage drives;
maintaining input/output (I/O) statistics for each virtual storage drive individually to determine which virtual storage drives have high I/O traffic and which virtual storage drives have low I/O traffic;
correlating the virtual storage drives to their respective RAID arrays; and
migrating extents from RAID arrays having virtual storage drives with high I/O traffic to RAID arrays having virtual storage drives with low I/O traffic.

2. The method of claim 1, wherein maintaining I/O statistics for each virtual storage drive individually comprises tracking average I/O to each virtual storage drive over a specified period of time.

3. The method of claim 2, wherein maintaining I/O statistics for each virtual storage drive individually comprises calculating a standard deviation from the average I/O.

4. The method of claim 1, wherein maintaining I/O statistics for each virtual storage drive individually comprises finding a peak I/O to each virtual storage drive over a specified period of time.

5. The method of claim 1, further comprising calculating a first average I/O traffic for the virtual storage drives with high I/O traffic, and a second average I/O traffic for the virtual storage drives with low I/O traffic.

6. The method of claim 5, further comprising calculating a number of extents to migrate from RAID arrays having virtual storage drives with high I/O traffic, to RAID arrays having virtual storage drives with low I/O traffic.

7. The method of claim 6, wherein the number of extents varies in accordance with a difference between the first average I/O traffic and the second average I/O traffic.

8. A computer program product for balancing load among virtual storage drives, the computer program product comprising a non-transitory computer-readable storage medium having computer-usable program code embodied therein, the computer-usable program code configured to perform the following when executed by at least one processor:
provide access to a plurality of physical storage drives;
divide each physical storage drive into a plurality of virtual storage drives;
create redundant array of independent disks (RAID) arrays from the virtual storage drives such that virtual storage drives on the same physical storage drive may be utilized in different RAID arrays, wherein each RAID array is made up of extents that are striped across its virtual storage drives;
maintain input/output (I/O) statistics for each virtual storage drive individually to determine which virtual storage drives have high I/O traffic and which virtual storage drives have low I/O traffic;
correlate the virtual storage drives to their respective RAID arrays; and
migrate extents from RAID arrays having virtual storage drives with high I/O traffic to RAID arrays having virtual storage drives with low I/O traffic.

9. The computer program product of claim 8, wherein maintaining I/O statistics for each virtual storage drive individually comprises tracking average I/O to each virtual storage drive over a specified period of time.

10. The computer program product of claim 9, wherein maintaining I/O statistics for each virtual storage drive individually comprises calculating a standard deviation from the average I/O.

11. The computer program product of claim 8, wherein maintaining I/O statistics for each virtual storage drive individually comprises finding a peak I/O to each virtual storage drive over a specified period of time.

12. The computer program product of claim 8, wherein the computer-usable program code is further configured to calculate a first average I/O traffic for the virtual storage drives with high I/O traffic, and a second average I/O traffic for the virtual storage drives with low I/O traffic.

13. The computer program product of claim 12, wherein the computer-usable program code is further configured to calculate a number of extents to migrate from RAID arrays having virtual storage drives with high I/O traffic, to RAID arrays having virtual storage drives with low I/O traffic.

14. The computer program product of claim 13, wherein the number of extents varies in accordance with a difference between the first average I/O traffic and the second average I/O traffic.

15. A system for balancing load among virtual storage drives, the system comprising:
at least one processor;
at least one memory device operably coupled to the at least one processor and storing instructions for execution on the at least one processor, the instructions causing the at least one processor to:
provide access to a plurality of physical storage drives;

divide each physical storage drive into a plurality of virtual storage drives;

create redundant array of independent disks (RAID) arrays from the virtual storage drives such that virtual storage drives on the same physical storage drive may be utilized in different RAID arrays, wherein each RAID array is made up of extents that are striped across its virtual storage drives;

maintain input/output (I/O) statistics for each virtual storage drive individually to determine which virtual storage drives have high I/O traffic and which virtual storage drives have low I/O traffic;

correlate the virtual storage drives to their respective RAID arrays; and migrate extents from RAID arrays having virtual storage drives with high I/O traffic to RAID arrays having virtual storage drives with low I/O traffic.

16. The system of claim 15, wherein maintaining I/O statistics for each virtual storage drive individually comprises tracking average I/O to each virtual storage drive over a specified period of time.

17. The system of claim 16, wherein maintaining I/O statistics for each virtual storage drive individually comprises calculating a standard deviation from the average I/O.

18. The system of claim 15, wherein maintaining I/O statistics for each virtual storage drive individually comprises finding a peak I/O to each virtual storage drive over a specified period of time.

19. The system of claim 15, wherein the instructions further cause the at least one processor to calculate a first average I/O traffic for the virtual storage drives with high I/O traffic, and a second average I/O traffic for the virtual storage drives with low I/O traffic.

20. The system of claim 19, wherein the instructions further cause the at least one processor to calculate a number of extents to migrate from RAID arrays having virtual storage drives with high I/O traffic, to RAID arrays having virtual storage drives with low I/O traffic, wherein the number of extents varies in accordance with a difference between the first average I/O traffic and the second average I/O traffic.

* * * * *